United States Patent
Vasseur et al.

(10) Patent No.: US 8,014,291 B2
(45) Date of Patent: Sep. 6, 2011

(54) RELAXED CONSTRAINED SHORTEST PATH FIRST (R-CSPF)

(75) Inventors: Jean-Philippe Vasseur, Dunstable, MA (US); Stefano Novello, Concord, MA (US); Steve Y. Chiu, Bedford, MA (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 11/605,013

(22) Filed: Nov. 28, 2006

(65) Prior Publication Data

US 2008/0123533 A1    May 29, 2008

(51) Int. Cl.
*H04J 1/16* (2006.01)
(52) U.S. Cl. .......................................... 370/238
(58) Field of Classification Search .................. 370/229, 370/235, 238, 238.1, 351, 352, 356, 464, 370/456, 468, 395.5
See application file for complete search history.

(56) References Cited

U.S. PATENT DOCUMENTS

| | | | |
|---|---|---|---|
| 6,259,673 B1 * | 7/2001 | Yoshihara et al. | 370/238 |
| 6,363,319 B1 * | 3/2002 | Hsu | 701/202 |
| 6,393,473 B1 | 5/2002 | Chu | |
| 6,717,920 B1 | 4/2004 | Cheng | |
| 6,775,280 B1 | 8/2004 | Ma et al. | |
| 7,031,253 B1 | 4/2006 | Katukam et al. | |
| 7,031,262 B2 | 4/2006 | Vasseur et al. | |
| 7,042,838 B1 | 5/2006 | Shand et al. | |
| 7,143,006 B2 | 11/2006 | Ma et al. | |
| 2003/0118024 A1 * | 6/2003 | Lee et al. | 370/395.1 |
| 2004/0042404 A1 * | 3/2004 | Ravindran et al. | 370/238 |
| 2004/0071089 A1 * | 4/2004 | Bauer et al. | 370/238 |
| 2005/0047327 A1 * | 3/2005 | Saleh et al. | 370/221 |
| 2006/0250964 A1 | 11/2006 | Vasseur et al. | |
| 2006/0262722 A1 | 11/2006 | Chapman et al. | |

FOREIGN PATENT DOCUMENTS

GB    2400266 A  * 10/2004

OTHER PUBLICATIONS

Awduche, D. et al., Request for Comments 3209, entitled "RSVP-TE: Extensions to RSVP for LSP Tunnels", Network Working Group, IETF, Dec. 2001, pp. 1-57.

Smit, H. et al., Request for Comments 3784, entitled "Intermediate System to Intermediate System (IS-IS) Extensions for Traffic Engineering (TE)", Network Working Group, IETF, Jun. 2004, pp. 1-13.

(Continued)

*Primary Examiner* — Kwang B Yao
*Assistant Examiner* — Obaidul Huq
(74) *Attorney, Agent, or Firm* — Cesari and McKenna, LLP (57) ABSTRACT

In one embodiment, a target bandwidth, a lower boundary constraint on bandwidth, and an upper boundary constraint on cost are configured on a path computation device. The device may then compute a set of paths that is within the lower bandwidth boundary and upper cost boundary constraints. If the set of paths contains one or more paths, the device may select a path having a bandwidth value that is closest to the target bandwidth. However if the set of paths contains no paths, the device may search amongst paths that violate either the maximum cost or minimum bandwidth limits, selecting the path closest to the violated constraint (e.g., whose combined violation is minimized). Also, a weighting factor may be configured to establish the relative importance for a cost violation in comparison to a bandwidth violation.

17 Claims, 6 Drawing Sheets

OTHER PUBLICATIONS

Katz, D. et al., Request for Comments 3630, entitled "Traffic Engineering (TE) Extensions to OSPF Version 2", Network Working Group, IETF, Sep. 2003, pp. 1-14.

Berger, L., Request for Comments 3473, entitled "Generalized Multi-Protocol Label Switching (GMPLS) Signaling Resource ReserVation Protocol-Traffic Engineering (RSVP-TE) Extensions", Network Working Group, IETF, Jan. 2003, pp. 1-40.

Farrel, A. et al., Request for Comments 4655, entitled "A Path Computation Element (PCE)-Based Architecture", Network Working Group, IETF, Aug. 2006, pp. 1-38.

\* cited by examiner

RELAXED CONSTRAINED SHORTEST PATH FIRST (R-CSPF)

TECHNICAL FIELD

The present disclosure relates generally to computer networks, and, more particularly, to computation of constrained paths within computer networks.

BACKGROUND

Computation of paths within a computer network, e.g., for tunnels through the network, is generally performed in either an unconstrained or a constrained manner. For unconstrained path computation, such as according to a Shortest Path First (SPF) algorithm, a path computation device (e.g., router) may determine a shortest path (e.g., based on a path metric, such as cost) between a source node ("source") and one or more destination nodes ("destinations") using any available link in the computer network. When performing constrained path computation, such as a Constrained SPF (CSPF), on the other hand, the device may determine a shortest path between the source and destination using only links in the network that meet one or more configured constraints. Notably, constraints may be configured for any number of attributes, such as a minimum bandwidth value of a link, a maximum latency, maximum cost, etc. For example, tunnels such as Multi-Protocol Label Switching (MPLS) Traffic Engineering (TE) Label Switched Paths (LSPs) may be computed using CSPF, as will be understood by those skilled in the art.

One problem associated with CSPF path computation is that the configured constraints are "hard" constraints, such that any link that does not meet the constraints (e.g., that has less bandwidth than the minimum bandwidth, higher latency than the maximum latency, etc.) is removed from a set of links used for the shortest path computation. In particular, this may result in a high path cost in order to meet the constraints (e.g., minimum bandwidth) where only high cost links remain that meet the constraints. Often, this high cost path may be used even though a substantially lower cost path may have been found by "relaxing" the constraints, i.e., configuring less stringent constraints. That is, conventional CSPF uses hard/static constraints, and does not allow for a "tradeoff" to be considered between constraints (e.g., relaxing one attribute constraint that results in another attribute having a more favorable value).

For instance, assume a system administrator requests computation for a 100 megabits per second (Mbps) tunnel from a source to a destination (i.e., a minimum bandwidth constraint of 100 Mbps). By performing a CSPF computation, it may be determined that a shortest path has a cost of "200". Conversely, had the bandwidth constraint been reduced (relaxed) to 90 Mbps, the cost may have also been reduced, e.g., significantly, such as to a shortest path having a cost of "100". In other words, a tradeoff exists where meeting one attribute/constraint, e.g., bandwidth, may result in other unsatisfactory attribute values, such as high cost, high delay, high jitter, etc., while meeting a lesser (relaxed) constraint (e.g., 10% lower bandwidth) may result in more favorable attribute values (e.g., 50% lower cost). There is generally no known efficient manner to determine whether relaxation of certain attribute constraints might produce more favorable values for other attributes and, thus, this determination is generally not performed. Although the administrator may manually attempt different constraint values, such an attempt is not efficient to determine a substantially optimal tradeoff between attributes.

In addition, a worst case result of using hard constraints for CSPF is where no satisfactory paths are found from the source to the destination(s) (e.g., no paths meet the 100 Mbps constraint above). In that worst case, the path computation fails and, if desired, a new set of configured (hard) constraints that has been relaxed may be manually configured by the system administrator for a new CSPF computation, e.g., until a satisfactory path is found. However, such configuration is inefficient and cumbersome, and is difficult to guarantee an optimal path solution (e.g., where constraints become more relaxed than need be), particularly where constraints are manually relaxed.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a target bandwidth, a lower boundary constraint on bandwidth, and an upper boundary constraint on cost are configured on a path computation device. The device may then compute a set of paths that is within the lower bandwidth boundary and upper cost boundary constraints. If the set of paths contains one or more paths, the device may select a path having a bandwidth value that is closest to the target bandwidth. However if the set of paths contains no paths, the device may search amongst paths that violate either the maximum cost or minimum bandwidth limits, selecting the path closest to the violated constraint (e.g., whose combined violation is minimized). Also, a weighting factor may be configured to establish the relative importance for a cost violation in comparison to a bandwidth violation.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to inter-connect various ASes that operate under different administrative domains. As used herein, an AS, area, or level is generally referred to as a "domain."

Figure 1:
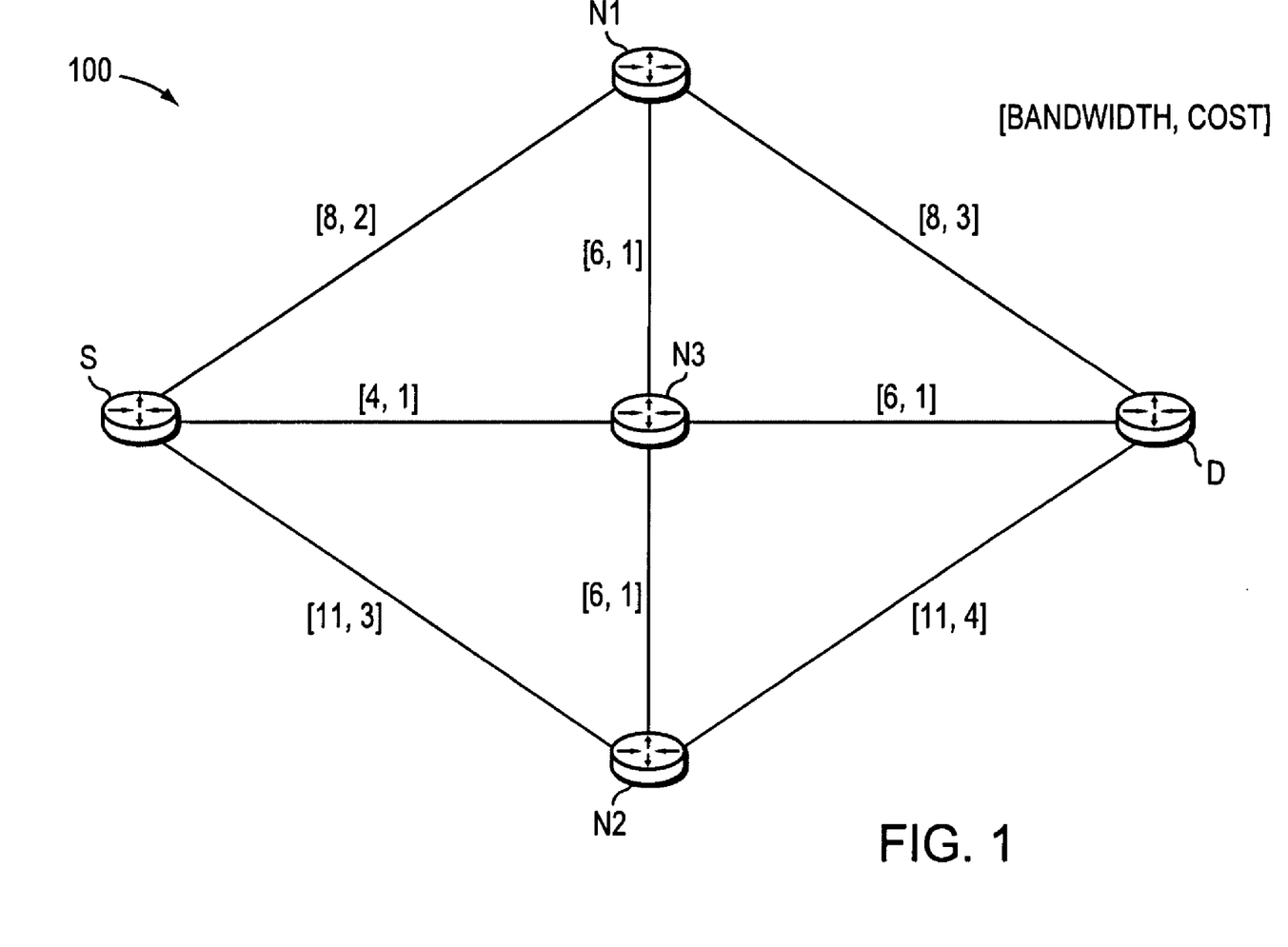
FIG. 1 illustrates an example computer network.

FIG. 1 is a schematic block diagram of an example computer network 100 illustratively comprising nodes (e.g., routers), such as a source node "S", destination node "D", and intermediate nodes "N1", "N2", and "N3" interconnected by links as shown. Illustratively, the numbers within brackets as "[bandwidth, cost]" for each link indicate respective bandwidth and cost values (as used herein). For instance, the link between node S and node N3 ("link S-N3" as used herein) has a bandwidth of 4 (e.g., Megabits per second, Mbps) and a cost of 1, as will be understood by those skilled in the art. Those skilled in the art will also understand that any number of nodes, routers, links, etc. may be used in the computer network and interconnected in any manner, and that the view shown herein is for simplicity. In addition, the values corresponding to each link (e.g., bandwidth and/or cost) are also merely examples used for simplicity.

Data packets may be exchanged among the nodes of the computer network 100 is using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
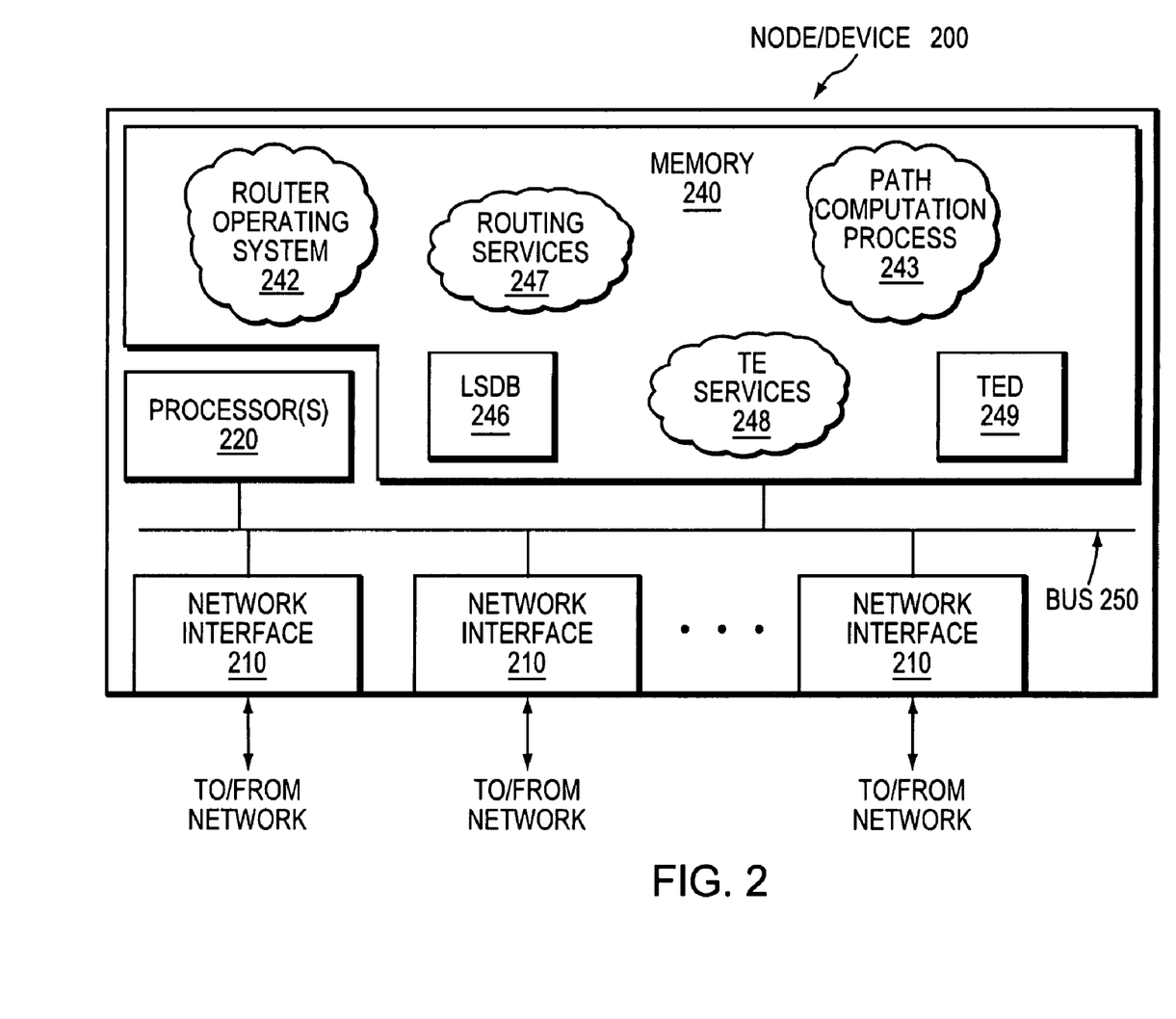
FIG. 2 illustrates an example network node/device.

FIG. 2 is a schematic block diagram of an example node/device 200 that may be advantageously used with one or more embodiments described herein, e.g., as a path computation device, described herein. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, such as a Traffic Engineering Database (TED) 249 and Link State Database (LSDB) 246. A router operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, Traffic Engineering (TE) services 248, and a path computation process 243 as described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a routing and/or forwarding information database (not shown) containing, e.g., data used to make routing and/or forwarding decisions, such as link costs, etc. In particular, changes in the network topology may be communicated among routers 200 using routing protocols, such as the conventional OSPF and IS-IS link-state protocols (e.g., to "converge" to an identical view of the network topology). For example, information regarding the links may be maintained in LSDB 246, as will be understood by those skilled in the art. Notably, routing services 247 may also perform functions related to virtual routing protocols, such as maintaining VRF instances (not shown), or tunneling protocols, such as for Multi-Protocol Label Switching (MPLS), etc., each as will also be understood by those skilled in the art.

TE services 248 contain computer executable instructions for implementing TE functions in accordance with the embodiments described herein. Examples of TE (e.g., for MPLS) can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, RFC 3630, entitled *Traffic Engineering (TE) Extensions to OSPF Version* 2 dated September 2003, and RFC 3473, entitled, *Generalized Multi-Protocol Label Switching (GMPLS) Signaling Resource ReSerVation Protocol-Traffic Engineering (RSVP-TE) Extensions* dated January 2003, the contents of all of which are hereby incorporated by reference in their entirety. A TE database (TED) 249 may be illustratively resident in memory 240 and used to store TE information provided by the routing protocols, such as IGP, BGP, and/or other protocols as will be understood by those skilled in the art. For example, bandwidth values associate with links of the network (e.g., illustrated in FIG. 1 next to links in network 100) and other values, e.g., other TE information (described herein), may be stored in the TED 249, as will also be understood by those skilled in the art. The TED 249 may be illustratively maintained and managed by TE services 248.

Tunnels, e.g., MPLS TE Label Switched Paths (TE-LSPs), can be configured within a single domain, e.g., area, level, or AS, or may also span multiple domains, e.g., areas, levels, or ASes, and may have guaranteed bandwidth under certain conditions. Establishment of a tunnel (e.g., TE-LSP) requires computation of a path between a head-end node (source) to one or more tail-end nodes (destinations), signaling along the path, and modification of forwarding tables at intermediate nodes along the path. Optimally, the computed path is the "shortest" path, as measured in some metric (cost, length, etc.), that satisfies all relevant Traffic Engineering constraints or "attributes," such as e.g., required bandwidth, "affinities" (administrative constraints to avoid or include certain links), priority, class type, etc. Path computation can either be performed by the head-end node of the tunnel or by some other entity operating as a path computation element (PCE) not co-located on the head-end node (e.g., a PCE as described in RFC 4655 by Farrel et al., entitled *A Path Computation Element (PCE)-Based Architecture*, dated August 2006). The "path computation device" (e.g., a head-end node or PCE computing the path) exploits its knowledge of network topology and resources available on each link to perform the path computation according to the Traffic Engineering constraints for the tunnel. Various path computation methodologies are available including a Constrained Shortest Path First (CSPF) computation algorithm.

As noted, CSPF may be used to determine a shortest path between the source (e.g., node S) and destination (e.g., node D) using only links in the network that meet one or more configured constraints (e.g., TE constraints), such as a minimum bandwidth requirement, etc. These configured constraints, however, are generally "hard" constraints (i.e., static), such that any link that does not meet the constraints is removed from the set of links used for the shortest path computation. In particular, the use of hard/static constraints does not allow for a "tradeoff" to be considered between constraints (e.g., where relaxing one attribute constraint may result in another attribute having a more favorable value). Also, using hard constraints for CSPF may result in no available paths from the source to the destination(s).

Relaxed CSPF (R-CSPF)

According to embodiments of the disclosure, a target bandwidth, a lower boundary constraint on bandwidth, and an upper boundary constraint on cost are configured on a path computation device, e.g., a head-end node or PCE (e.g., source node S). For instance a system administrator (or a dynamic path computation process) may wish to determine a constrained path from a source (node S) to a destination (node D) within the network 100, e.g., for establishing a new tunnel having a specified bandwidth value (such as an MPLS TE-LSP). As such, the system administrator may configure a minimum acceptable bandwidth, a maximum acceptable cost, and a target bandwidth value for the path, e.g., the specified bandwidth value for the tunnel.

For example, assume as in FIG. 1 that a constrained path is desired between the source node S and destination node D. Further assume that the target bandwidth for the path (e.g., for a tunnel) is 9 Mbps. According to R-CSPF, the system administrator (or dynamic process) may configure the target bandwidth ("B", 9 Mbps), and may additionally configure the constraint boundaries (i.e., acceptable values), such as, e.g., a minimum bandwidth constraint ("U") of 5 Mbps, and a maximum cost constraint ("V") of 6. Notably, other boundary constraints may be configured in accordance with one or more embodiments described herein, and as will be appreciated by those skilled in the art. For instance, boundaries may be defined for a maximum/minimum path hop count, latency, delay, affinity, etc. In particular, an affinity constraint may be incorporated within the cost boundary constraint, by adjusting the cost of a path to also reflect the affinity of that path. For instance, a link cost may consist of the original cost in addition to either "0" if the link satisfies affinity constraints, or a comparably large value if the link violates affinity. In this manner, paths that violate affinity will generally only be selected when there is no other path option that does not violate affinity.

The path computation device 200 (e.g., path computation process 243) may then compute a set of paths within the network 100 between the source and destination accordingly. For instance, by examining the links of the network 100 (e.g., from LSDB 246 and/or TED 249), the path computation device may determine a residual bandwidth of each link, e.g., as shown in FIG. 1 as described above. By doing so, the path computation device may determine the set of all possible maximum bandwidth values for paths through the network. In other words, if a link has a bandwidth value "X", then any path in the network that may traverse that link will have a maximum bandwidth no greater than "X". If the largest residual bandwidth value on any link in the network is "Y", then the largest available path will have a bandwidth no greater than "Y" accordingly. For example, as can be seen in FIG. 1, with links corresponding to bandwidth values of 4, 6, 8, and 11 Mbps (examples for simplicity), the possible corresponding maximum path bandwidths within the network are among 4, 6, 8, and 11 Mbps.

Figure 3:
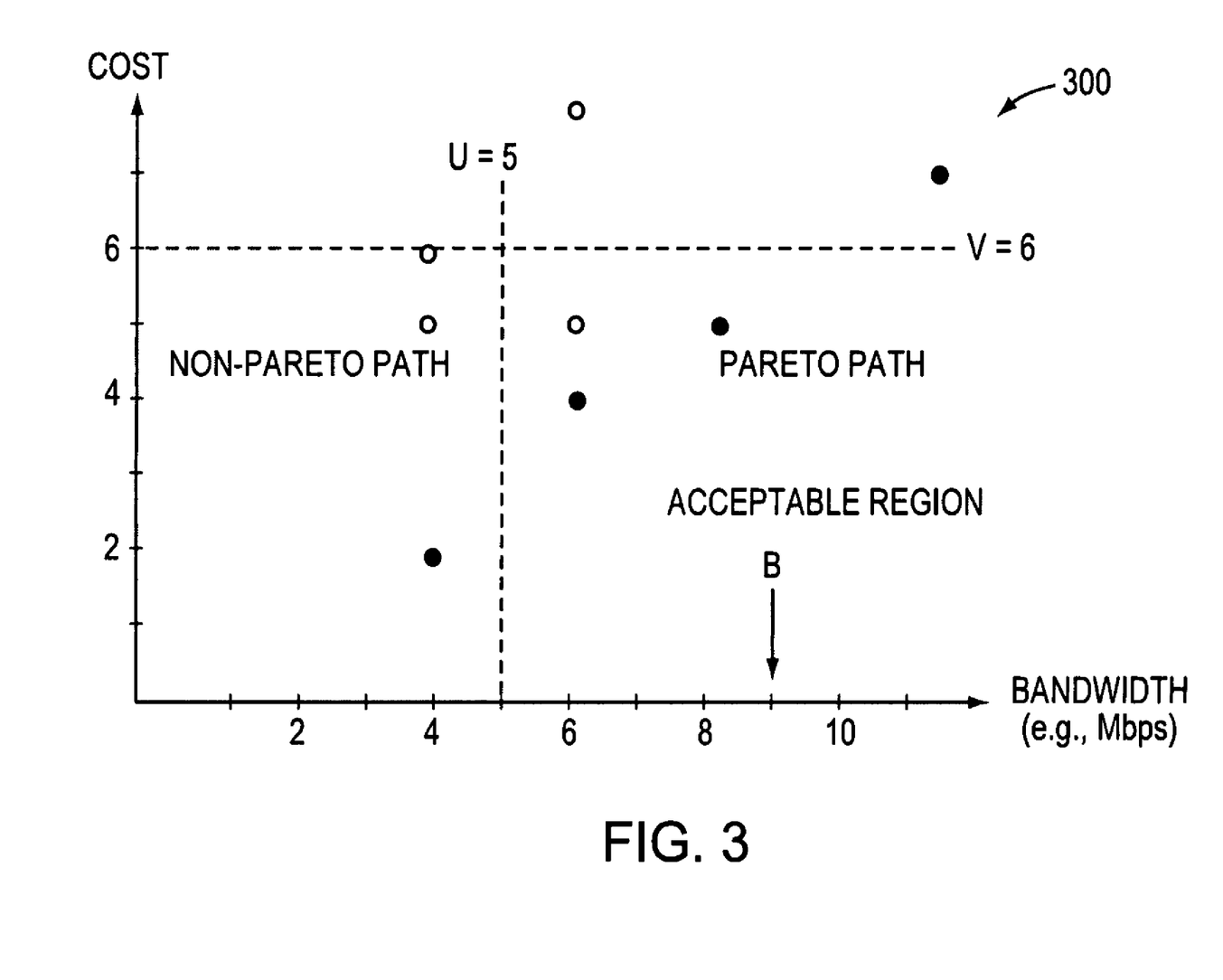
FIG. 3 illustrates an example graph of computed paths solutions with a non-empty acceptable region.

The path computation device may then compute paths for each corresponding path bandwidth to determine the best (e.g., lowest cost) path at each corresponding maximum bandwidth value. As an example, assume that the path computation device attempts to establish a tunnel over a path with up to 4 Mbps of bandwidth from source node S to destination node D. It can be seen that all nine paths from S to D have 4 Mbps or more of bandwidth and a path cost among (2, 4, 5, 6, 7, and 8). FIG. 3 illustrates an example graph 300 of computed paths in accordance with one or more embodiments described herein, e.g., plotting the possible path solutions (e.g., points on the graph) between node S and node D according to bandwidth and cost. For any paths greater than 4 Mbps, but less than or equal to 6 Mbps, another set of paths may be computed using only the 6 Mbps and above links. That is, because any bandwidth value between 4 Mbps and 6 Mbps is unable to use links having less than 4 Mbps of bandwidth, and can use any links having 6 Mbps or more of bandwidth, only those links having 6 Mbps and above may be included within the path computation. (Those skilled in the art will appreciate that the values 4 Mbps and 6 Mbps are used for computations because there are no links in illustrative network 100 that have a bandwidth value between the two. For example, a 5 Mbps path could not use 4 Mbps links and, as such, would be required to use 6 Mbps links or higher.) Accordingly, the path computation device removes those links with less is than 6 Mbps (i.e., the 4 Mbps links), and computes another set of paths (e.g., reducing the total number of possible paths from 9 to 6). The same procedure may be used for subsequent residual bandwidth values up to the largest possible residual bandwidth value, e.g., 11 Mbps, resulting in path S-N2-D at a cost of 7. Illustratively, each point on the graph 300 indicates a possible path solution, e.g., a cost computed for a path at a particular residual bandwidth. Notably, a zero bandwidth solution may also be computed for the network 100. Moreover, where multiple constraints are to be plotted (e.g., bandwidth, cost, and latency), a corresponding multidimensional version of graph 300 may be used to represent the possible solutions and their corresponding constraint values.

The computation of path solutions may occur in any order (e.g., from smallest residual bandwidth to largest, largest to smallest, etc.). Illustratively, in accordance with one or more embodiments described herein, the path computation device may first compute the set of paths that is within the lower bandwidth boundary and upper cost boundary constraints (i.e., those paths that "meet" the constraints), e.g., within the "acceptable region" in graph 300. For instance, the path computation device may determine the set of residual bandwidth values that is equal to or greater than the lower bandwidth constraint (e.g., 5 Mbps), and may only compute solutions for those paths. Once a residual bandwidth value is reached whose lowest cost path has a higher cost than the maximum cost constraint (e.g., 11 Mbps having a cost of 7, which is greater than 6), the path computation device may complete computation of path solutions accordingly. Notably, the path computation device may then compute paths that are not within the lower bandwidth boundary and upper cost boundary constraints, as necessary and as described below. Alternatively, in accordance with one or more embodiments described herein, the path computation device may simply compute the set of all available paths in the network 100, and then apply the constraint boundaries, as described herein.

Illustratively, the path computation device needs only to consider "Pareto-optimal" paths during computation of possible path solutions. Pareto-optimality, generally, is related to the set of solutions whose components cannot be improved in terms of one objective (e.g., constraint) without getting worse in at least one of other objectives. For example, assume that a path (not shown) in the network 100 between the source node S and destination node D is available that has less available bandwidth than the path S-N1-D, but at a higher cost. That is, while path S-N1-D illustratively has 8 Mbps of bandwidth and a cost of 5, any path with a lower bandwidth (e.g., 6 Mbps) and equal or higher cost (e.g., 5) is not a Pareto-optimal path, since it would be more optimal to use the lower cost path (path S-N1-D) for a bandwidth requirement of 6 Mbps (since path S-N1-D has more than 6 Mbps of available bandwidth). Therefore, the path computation device needs only to consider the Pareto-optimal solutions, as non-Pareto-optimal solutions will have equal or less bandwidth and a higher cost, or have less bandwidth and equal or higher cost, than some Pareto-optimal solution. Those skilled in the art will understand various techniques to compute Pareto-optimal solutions, and such techniques may be used advantageously in accordance with one or more embodiments described herein. As shown in FIG. 3, then, by restricting the desired feasible paths (the set of paths) to Pareto-optimal solutions, an efficient frontier is formed in the bandwidth-cost plane, as illustrated by the solid points (non-Pareto-optimal solutions are illustrated by the hollow points).

Note that there are occasions in networks 100 where multiple paths between the source (node S) and destination (node D) may have a same residual bandwidth value. In such situations, the path computation device may determine which of these paths has a lower cost, and only considers the lower-cost path (i.e., only adding the path having the lowest cost to the set of paths to consider). In other words, as mentioned above, only the Pareto-optimal path is used where a same bandwidth path with higher cost is not an optimal path as compared to the lower-cost path. In the event that the paths having the same bandwidth also have the same cost, the path computation device may also compare other constraint values to determine which path is the Pareto-optimal path for that residual bandwidth (e.g., based on better latency values, etc.). In the event all constraints and values for multiple paths remain equal, a tie-breaker value may be used for each path to select an appropriate path. For instance, the tie-breaker may be a better path hop count (i.e., a number of nodes/links along the path), a router identifier (ID) value of a branching point between the plurality of paths having the same bandwidth and cost (e.g., if in network 100 both paths from node S to node D were equal, a router ID value of node N1, N2, and N3 may be used to select the path), etc. Those skilled in the art will understand that other tie-breaker values may be used in accordance with the embodiments described herein, and that those described herein are merely examples.

Once the path solutions are computed, e.g., the Pareto-optimal path solutions, the path computation device may determine which set of paths fall within the constraint boundaries (meet the constraints). For instance, as defined by the minimum bandwidth value and maximum cost value, a region of acceptable path solutions may be created. In essence, by supplying acceptable boundaries for the constraints, the R-CSPF algorithm allows for "soft" constraints when selecting an optimal path from a source to a destination.

In response to one or more paths falling within the acceptable region, the path computation device may select a path from the set accordingly. (Notably, if there are any acceptable paths, at least one is a Pareto-optimal solution.) Illustratively, the selected path may be the path having a bandwidth value that is closest to the target bandwidth. In particular, because it is generally desirable to achieve the target bandwidth (e.g., 9 Mbps), the acceptable path that is closest to the target bandwidth and has a bandwidth greater than (or equal to) the target bandwidth is able to provide the target bandwidth, and has the lowest associated cost. In other words, the optimal solution is the path having the lowest cost that meets the target bandwidth. As used herein, the phrase "closest to" generally implies not only a graphical closeness (as illustrated in FIG. 3), but also a closeness in terms of available bandwidth.

In the event that none of the acceptable paths are above or equal to the target bandwidth (e.g., 9 Mbps), then an alternate, acceptable path that is closest to and less than the target bandwidth may be selected. Note that if the target bandwidth is larger than the highest available bandwidth, the selected path may be the path having the highest available bandwidth. For instance, as shown in the example in FIG. 3, two available Pareto-optimal solutions (for 6 and 8 Mbps paths) fall within the acceptable region. Illustratively, for a target bandwidth B that is no more than 6 Mbps, the Pareto-optimal path with a bandwidth of 6 Mbps is the chosen solution. Conversely, for a target bandwidth B above 6 Mbps, the Pareto-optimal path with a bandwidth of 8 Mbps is the solution.

Figure 4:
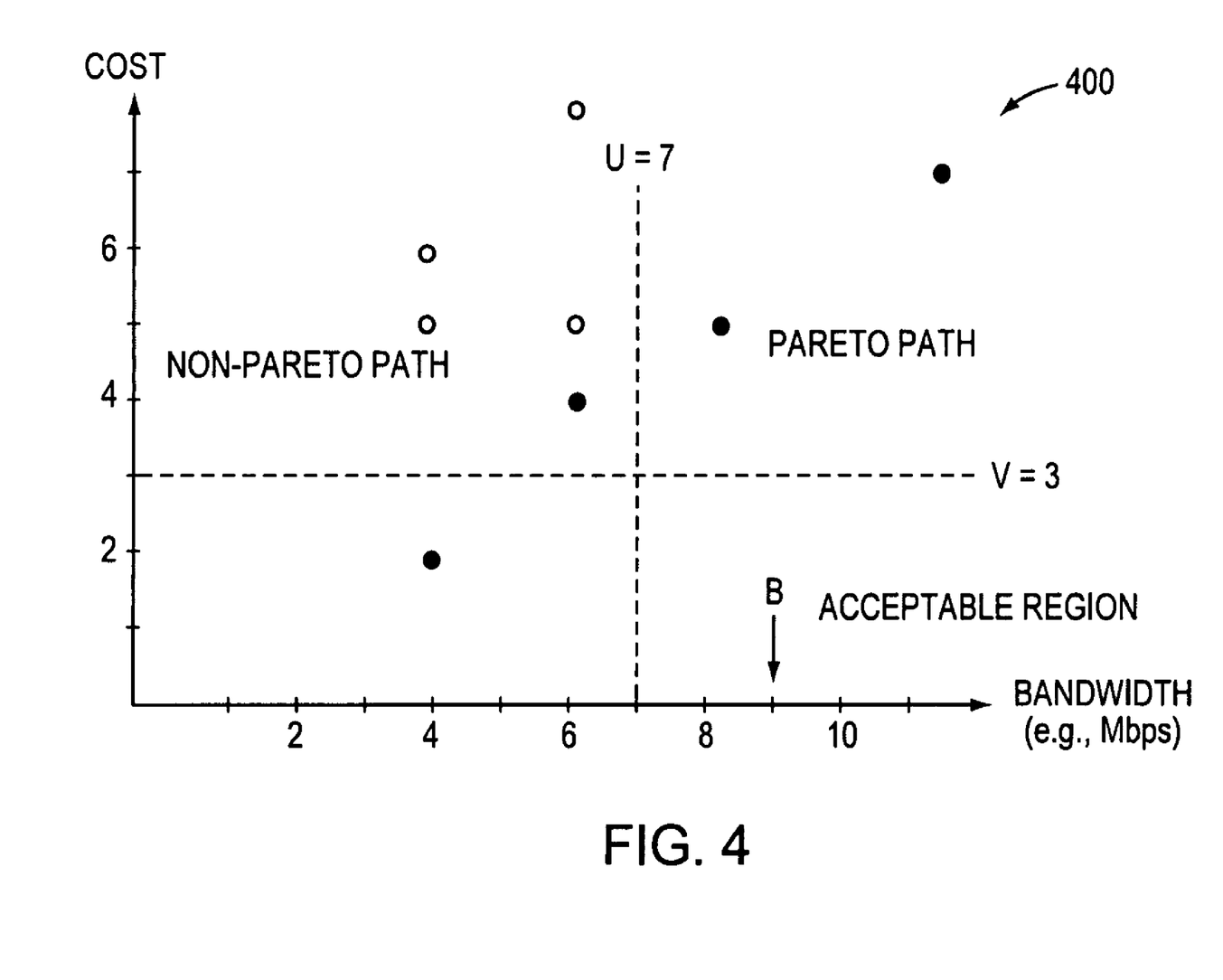
FIG. 4 illustrates an example graph of computed path solutions outside the acceptable region.

Also, if the set of acceptable paths contains no paths that meet the constraints (i.e., all path solutions are unacceptable based on the constraint boundaries, as illustrated in FIG. 4), the device may search for paths that are outside of the lower bandwidth boundary or upper cost boundary constraints, and may select either a path that has a bandwidth and/or cost that is closest to one of either the lower bandwidth boundary or the upper cost boundary or both. In other words, closeness may be determined by computing a degree of constraint violation for the Pareto-optimal solutions outside of the acceptable region (see FIG. 4). The total amount of constraint violation is equal to the sum (e.g., a weighted sum, described below) of the bandwidth constraint violation and the cost constraint violation (i.e., how far from the bandwidth and/or cost boundary is the non-conforming path solution).

Notably, in order to adjust the scale of "closeness" of each solution to satisfying the constraints, a weighting factor ("r") may be applied to the constraint parameters. For example, in the event a system administrator (or dynamic process) determines/configures that it is more important to have a lower cost than to have sufficient bandwidth (or other scales of importance, as will be understood), a weight may be applied to "skew" the closeness of a particular path solution to being acceptable. Illustratively, the weighting factor "r" may be applied to the cost attribute to indicate its importance relative to the bandwidth. For example, if cost is configured to be three-times more important than bandwidth, then according to the scale shown in graph 300, the 2 Mbps closeness of the 4 Mbps path as compared to the greater cost (by 1) of the 11 Mbps path is changed such that the 2:1 closeness comparison is now 2:3, thus the 4 Mbps path may be selected. Those skilled in the art will appreciate that even the 1-to-1 mapping above has an inherent weight/scale, such that it is configured to compare a cost of 1 equally to 1 Mbps.

Illustratively, the search for the solution with the least violation may compute the first Pareto-optimal solution having a bandwidth greater than the lower bandwidth boundary (if any) and the first Pareto-optimal solution having a bandwidth less than the lower bandwidth boundary (if any) with a cost that is within the upper cost constraint. If there are no Pareto-optimal solutions having a bandwidth less than the lower bandwidth boundary with a cost that is within the upper cost constraint, the search may continue to compute all the Pareto-optimal solutions having a bandwidth less than the lower bandwidth boundary (i.e., solutions that meet neither the cost nor boundary constraint). For example, as illustrated in FIG. 4, the four Pareto-optimal paths are outside of a newly define acceptable region defined by U=7 and V=3. With a weighting factor for the cost attribute of r=0.5, the constraint violations of the four paths (represented by the solid points (4, 2), (6, 4), (8, 5), and (11, 7)) are computed to be 3, 1.5, 1, and 2, respectively. As such, the Pareto-optimal path S-N1-D with bandwidth and cost equal to (8, 5) has the smallest violation and will therefore be returned as the final solution in this case. Notice that the target bandwidth B does not need to be used for the computation under this second scenario.

In addition, in accordance with one or more embodiments described herein, the R-CSPF path computation may be used to optimize a previously established path from the source node S to the destination node D. For example, assume that the optimal 8 Mbps path (e.g., cost of 5) as determined above is used for establishment of an 8 Mbps tunnel (e.g., as close to the original target bandwidth of 9 Mbps), as will be understood by those skilled in the art. Over time, a system administrator (or dynamic process) may determine that it may be advantageous to determine whether a more optimal path exists, given a set of relaxed constraints and/or based on changes in network topology and/or TE information. For instance, assume that the same maximum cost constraint (V) remains a cost of 5, but because of various reasons, the target bandwidth (B) may be changed to 4 Mbps, and the minimum bandwidth constraint (U) is relaxed to 3 Mbps. (Notably, the constraints and/or target bandwidth need not be changed in order to check for more optimal paths, and the changes made herein are merely examples for illustration.)

Figure 5:
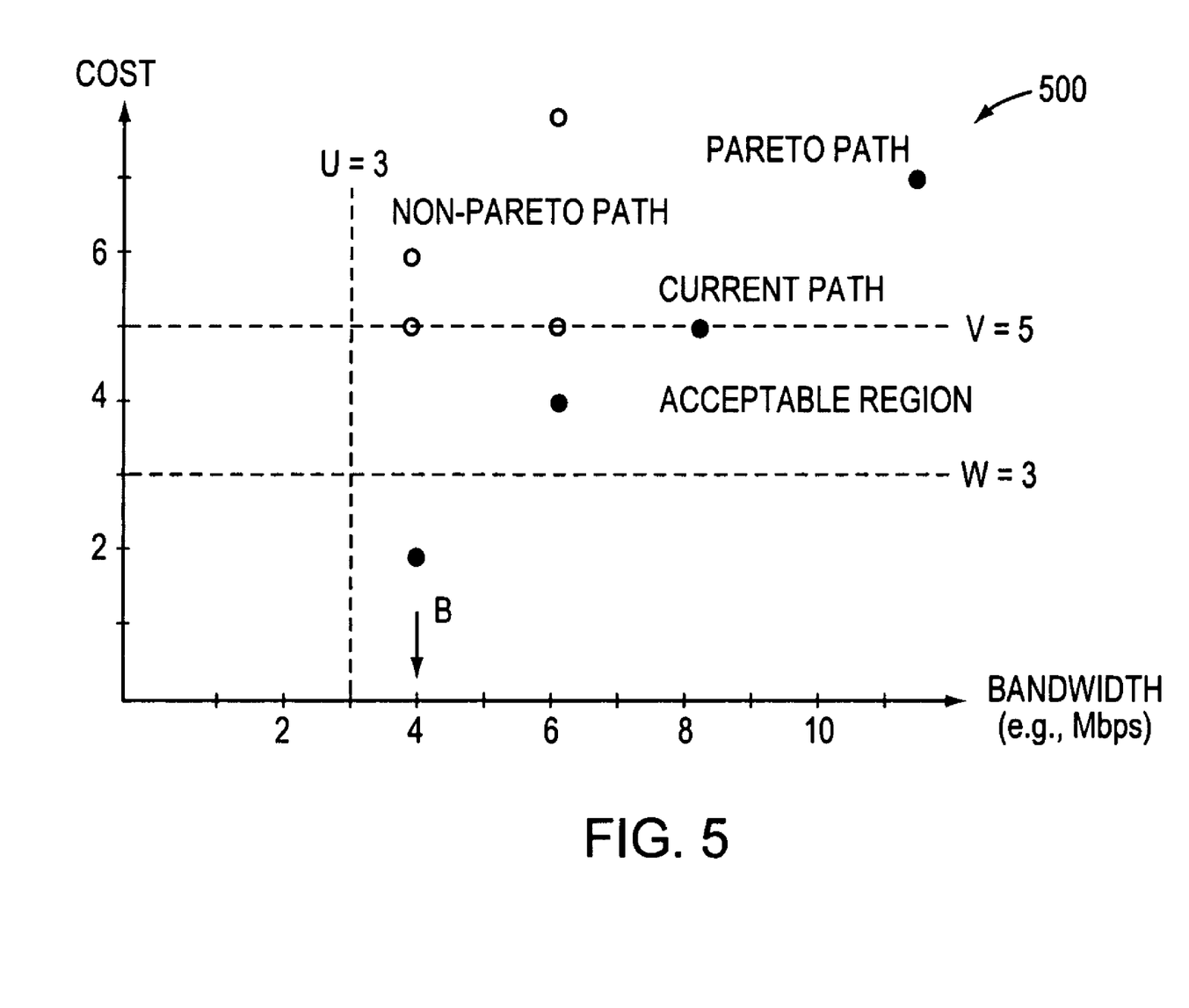
FIG. 5 illustrates an example graph of newly computed paths solutions for reoptimization.

FIG. 5 illustrates an example graph 500 of newly computed paths in accordance with one or more embodiments described herein, e.g., for optimizing path solutions available between source node S and destination node D. Based on the R-CSPF techniques described above, the Pareto-optimal 4 Mbps path with cost 2 may be selected. However, those skilled in the art will appreciate that large changes in cost, in particular, where cost reflects a link latency, may result in substantial jitter when the traffic is moved from the original path to the more optimized path (i.e., the delay in receiving traffic is substantially reduced, which may cause mis-ordering of packets, buffer overruns, etc.). For example, this jitter may be particularly problematic for Voice over IP (VoIP) traffic, as will be appreciated by those skilled in the art.

To account for the potential jitter, according to one or more embodiments described herein, an optional lower boundary constraint on cost ("W") may be configured (e.g., a cost of 3) at the path computation device as shown in FIG. 5, such that the region of acceptable path solutions in reduced to those paths that may not produce such a large change in cost. A similar selection technique as described above may thus be utilized to select path solutions that fall within the acceptable boundaries accordingly. So in this case, the Pareto-optimal 6 Mbps path with cost 4 will be selected instead. In other words, the change to the 4 Mbps path may result in undesirable conditions, e.g., jitter. Notably, the lower cost constraint may be gradually decreased upon further re-optimizations, such that the potential jitter caused by switching paths to a much lower cost/latency path is reduced (i.e., the change is spread out over time by performing multiple re-optimizations).

In the event available paths do not meet the minimum cost constraint during reoptimization (e.g., where the current/original path does not meet the new constraints) but are otherwise acceptable (based on minimum bandwidth and maximum cost), the lower cost boundary may be ignored, and the path may be selected as described above without a lower cost boundary. For instance, assuming the 8 Mbps path is unavailable, only the 6 Mbps path is acceptable based on values for U and V, but not W. In this case, the minimum cost (W) may be ignored, and the 6 Mbps path may be selected. Also, in the event paths do not meet the minimum bandwidth constraint and/or maximum cost constraint, a non-conforming path may be selected in a similar manner as described above.

Figure 6:
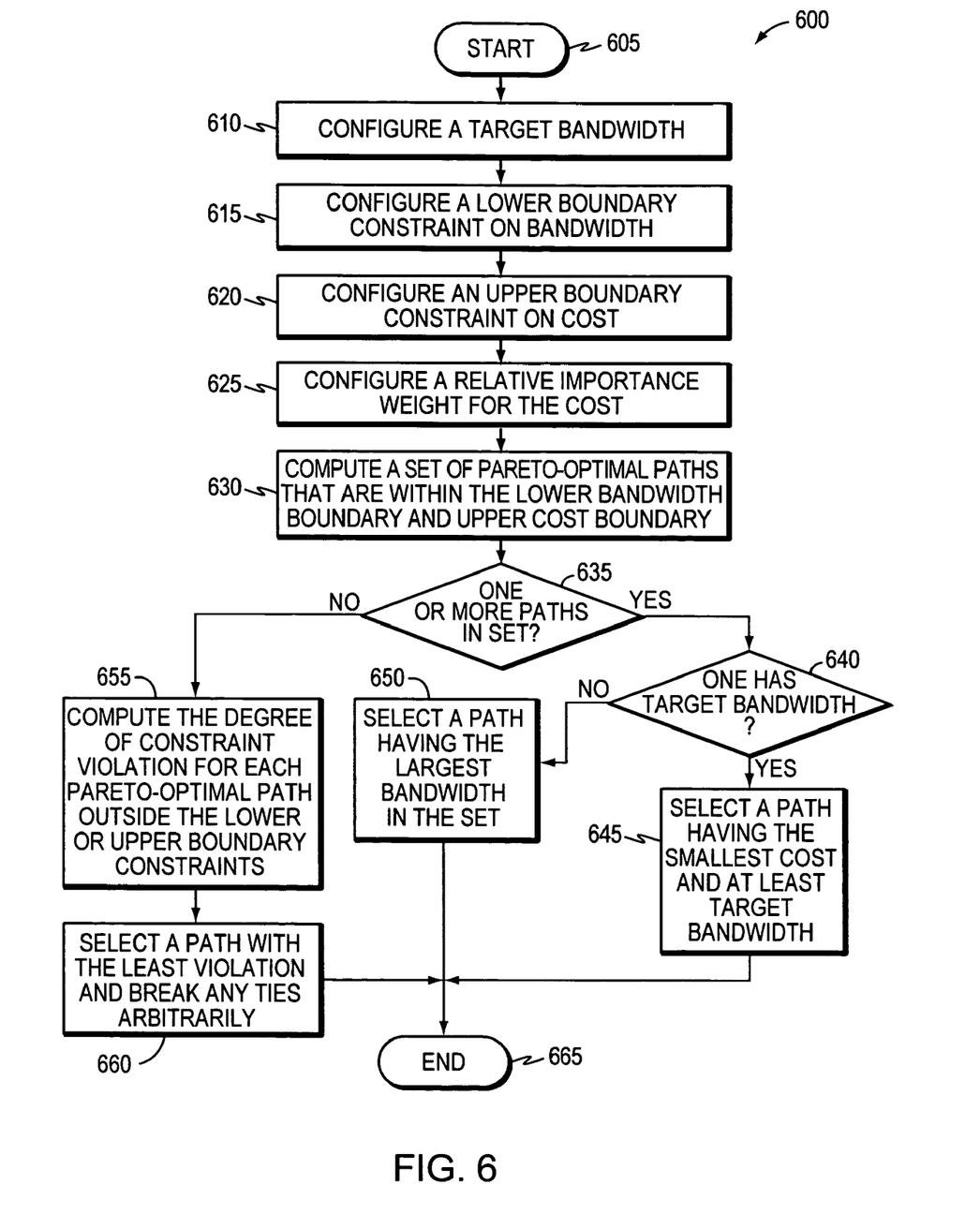
FIG. 6 illustrates an example procedure for R-CSPF in accordance with one or more embodiments described herein.

FIG. 6 illustrates an example procedure for R-CSPF in accordance with one or more embodiments described herein. The procedure 600 starts at step 605, and continues to step 610, 615, and 620, where a target bandwidth (B), a lower boundary constraint on bandwidth (U), and an upper boundary constraint on cost (V) are configured, respectively, e.g., on a path computation device 200 (e.g., by a system administrator or dynamic configuration). Optionally, in step 625, a weighting factor for the cost (a relative importance weight "r") may also be configured as described herein. In step 630, the device computes a set of paths (from a source S to one or more destinations D) that is within the lower bandwidth boundary and upper cost boundary constraints, as described above. If there are one or more paths in the set in step 635, the device further checks to see if there is such a path with the target bandwidth in step 640. If yes, the device selects a path with the smallest cost and required bandwidth in step 645 and the procedure 600 ends in step 665. If not, the device selects a path having a bandwidth value that is closest to the target bandwidth in step 650 and the procedure 600 ends in step 665.

If, on the other hand, there are no paths in the set in step 635, the device 200 may compute constraint violations for a set of Pareto-optimal solutions that are outside of the lower bandwidth boundary or upper cost boundary constraints in step 655, as described above. In step 660, the device selects a path with the least amount of constraint violation (e.g., closest to one of either the lower bandwidth boundary or the upper cost boundary or both), and will break any ties arbitrarily as described above. The procedure 600 then ends in step 650. Notably, as mentioned above, regardless of where the paths are in relation to the boundaries, the R-CSPF algorithm produces an optimal path as long as any path exists between the source and destination. Moreover, for re-computing a pre-established path as described above, a lower cost boundary constraint (W) may be added to the lower bandwidth (U) and upper cost (V) boundaries above, and the steps as described for procedure 600 may be followed in a similar manner in accordance with one or more embodiments described herein.

Advantageously, the novel techniques described herein provide an R-CSPF algorithm for use with computing paths in a computer network. By allowing relaxed constraints for CSPF computations, the novel techniques may determine optimal path solutions in a single operation of the R-CSPF algorithm, e.g., always producing a result so long as there is at least one path from the source to the destination(s), even where no path meets the relaxed constraints (e.g., where "optimal" in this instance implies a best available solution considering a set of weighted constraints). In particular, the techniques described above return balanced path solutions that take into account the tradeoff between is bandwidth and cost (and other attributes), while also considering acceptable boundaries configured at the path computation device. Further, the dynamic aspects of one or more embodiments described herein alleviate the need for cumbersome and inefficient manual configuration.

While there have been shown and described illustrative embodiments for R-CSPF, it is to be understood that various other adaptations and modifications may be made within the spirit and scope of the present invention. For example, the embodiments have been shown and described herein for use with computing paths for MPLS TE-LSPs. However, the embodiments of the invention in their broader sense are not so limited, and may, in fact, be used with any constrained path computation mechanisms, such as, e.g., for computing paths for other types of tunnels, or other reasons as will be understood by those skilled in the art. Also, while the above description describes certain values, scales, weights, etc., those skilled in the art will understand that these are merely examples, and that any value, scale, weight, etc., may be used in accordance with one or more embodiments described herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    configuring a target bandwidth for a constrained path;
    configuring a lower boundary constraint on bandwidth for the constrained path that is less than the target bandwidth;
    configuring an upper boundary constraint on cost for the constrained path;
    computing a set of paths, by a node in a computer network, from the source to one or more destinations that is within the lower bandwidth boundary and upper cost boundary constraints;
    determining whether the set of paths contains one or more paths;
    if the set of paths contains one or more paths,
        selecting a path of the set having a bandwidth value that is closest to the target bandwidth to use as the constrained path; and
    if the set of paths contains no paths,
        selecting a path that is outside of the lower bandwidth boundary or upper cost boundary constraints, and that has either a bandwidth or cost that is closest to one of the lower bandwidth boundary or the upper cost boundary or both the lower bandwidth boundary and the upper cost boundary, to use as the constrained path.

2. The method as in claim 1, further comprising:
    applying a weight to the cost; and
    selecting the path that minimizes a weighted sum of constraint violations beyond the lower bandwidth boundary and the upper cost boundary to use as the constrained path.

3. The method as in claim 1, wherein the step of selecting a path of the set having a bandwidth value that is closest to the target bandwidth further comprises:
    selecting the path that has a bandwidth that is closest to and greater than or equal to the target bandwidth.

4. The method as in claim 1, wherein the step of selecting a path of the set having a bandwidth value that is closest to the target bandwidth further comprises:
    determining that no path of the set has a bandwidth that is greater than the target bandwidth; and
    selecting the path that is closest to and less than the target bandwidth.

5. The method as in claim 1, further comprising:
    selecting the path to use as the constrained path in order to optimize a previously established path from the source to the one or more destinations.

6. The method as in claim 5, further comprising:
    configuring a lower boundary constraint on cost, wherein the step of computing further comprises computing the set of paths that is within the lower bandwidth boundary constraint, the upper cost boundary constraint, and the lower cost boundary constraint.

7. The method as in claim 1, further comprising:
    incorporating an affinity constraint within the upper cost boundary constraint.

8. The method as in claim 1, further comprising:
    configuring one or more other boundary constraints, wherein the step of computing further comprises computing the set of paths that is within the lower bandwidth boundary constraint, the upper cost boundary constraint, and the one or more other boundary constraints.

9. The method as in claim 8, wherein one of the one or more other boundary constraints is an affinity constraint.

10. The method as in claim 1, wherein the step of computing further comprises:
    determining that a plurality of paths of the set has a same bandwidth;
    determining which of the paths having the same bandwidth has a lowest cost; and
    adding, from the plurality of paths having the same bandwidth, only the path having the lowest cost to the set.

11. The method as in claim 1, wherein the step of computing further comprises:
    determining that a plurality of paths of the set has a same bandwidth and cost;
    determining which of the paths having the same bandwidth and cost has a best tie-breaker value; and
    adding, from the plurality of paths having the same bandwidth and cost, only the path having the best tie-breaker value to the set.

12. The method as in claim 11, wherein the tie-breaker value is selected from a group consisting of: a path hop count and a router identifier value of a branching point between the plurality of paths having the same bandwidth and cost.

13. The method as in claim 1, wherein the paths of the set are Pareto-optimal paths.

14. A node, comprising:
one or more network interfaces;
one or more processors coupled to the network interfaces and adapted to execute one or more processes; and
a memory adapted to store a path computation process executable by each processor, the path computation process when executed operable to: i) configure a target bandwidth for a constrained path, a lower boundary constraint on bandwidth for the constrained path, that is less than the target bandwidth, and an upper boundary constraint on cost for the constrained path, ii) compute a set of paths from a source to one or more destinations that is within the lower bandwidth boundary and upper cost boundary constraints, iii) determine whether the set of paths contains one or more paths, iv) if the set of paths contains one or more paths, select a path of the set having a bandwidth value that is closest to the target bandwidth to use as the constrained path, v) if the set of paths contains no paths, select a path that is outside of the lower bandwidth boundary or upper cost boundary constraints, and that has either a bandwidth or cost that is closest to one of the lower bandwidth boundary or the upper cost boundary or both the lower bandwidth boundary and the upper cost boundary, to use as the constrained path.

15. The node as in claim 14, wherein the path computation process when executed is further operable to:
apply a weight to the cost; and
select the path that minimizes a weighted sum of constraint violations beyond the lower bandwidth boundary and the upper cost boundary to use as the constrained path.

16. An apparatus, comprising:
means for configuring a target bandwidth for a constrained path;
means for configuring a lower boundary constraint on bandwidth for the constrained path that is less than the target bandwidth;
means for configuring an upper boundary constraint on cost for the constrained path;
means for computing a set of paths from a source to one or more destinations that is within the lower bandwidth boundary and upper cost boundary constraints;
means for determining whether the set of paths contains one or more paths;
means for selecting a path of the set having a bandwidth value that is closest to the target bandwidth to use as the constrained path, in response to the set containing one or more paths; and
means for selecting a path that is outside of the lower bandwidth boundary or upper cost boundary constraints, and that has either a bandwidth or cost that is closest to one of the lower bandwidth boundary or the upper cost boundary or both the lower bandwidth boundary and the upper cost boundary, to use as the constrained path, in response to the set containing no paths.

17. The apparatus as in claim 16, further comprising:
means for applying a weight to the cost; and
means for selecting the path that minimizes a weighted sum of constraint violations beyond the lower bandwidth boundary and the upper cost boundary to use as the constrained path.

* * * * *